(12) United States Patent
Canich et al.

(10) Patent No.: US 7,019,640 B2
(45) Date of Patent: Mar. 28, 2006

(54) SENSOR SUITE AND COMMUNICATION SYSTEM FOR CARGO MONITORING AND IDENTIFICATION

(75) Inventors: David J. Canich, Upland, CA (US); David D. Crouch, Corona, CA (US); James R. Gallivan, Pomona, CA (US); Robert E. Karlson, Mission Viego, CA (US); Keith G. Kato, Alta Loma, CA (US); David R. Sar, Corona, CA (US); Philip D. Starbuck, Redlands, CA (US)

(73) Assignee: Raytheon Company, Waltham, MA (US)

( * ) Notice: Subject to any disclaimer, the term of this patent is extended or adjusted under 35 U.S.C. 154(b) by 74 days.

(21) Appl. No.: 10/440,944

(22) Filed: May 19, 2003

(65) Prior Publication Data

US 2004/0233055 A1    Nov. 25, 2004

(51) Int. Cl.
*G08B 1/00* (2006.01)

(52) U.S. Cl. ............ 340/531; 340/539.13; 340/539.26; 340/568.1; 340/686.1; 340/825.49; 340/825.69; 340/825.72

(58) Field of Classification Search ................ 340/531, 340/568.1, 545.6, 547, 540, 541, 521, 529, 340/539.1, 539.13, 539.26, 571, 825.49, 340/825.69, 825.72, 686.1
See application file for complete search history.

(56) References Cited

U.S. PATENT DOCUMENTS

| | | | | |
|---|---|---|---|---|
| 3,961,323 A | * | 6/1976 | Hartkorn | 340/539.1 |
| 5,109,691 A | * | 5/1992 | Corrigan et al. | 73/23.36 |
| 5,528,228 A | * | 6/1996 | Wilk | 340/540 |
| 5,917,433 A | * | 6/1999 | Keillor et al. | 340/989 |
| 6,556,138 B1 | * | 4/2003 | Sliva et al. | 340/568.1 |
| 6,624,760 B1 | * | 9/2003 | Kinzel et al. | 340/870.11 |
| 6,657,549 B1 | * | 12/2003 | Avery | 340/825.49 |
| 6,670,887 B1 | * | 12/2003 | Dungan | 340/632 |
| 2004/0196152 A1 | * | 10/2004 | Russel et al. | |
| 2005/0046567 A1 | * | 3/2005 | Mortenson et al. | |

OTHER PUBLICATIONS

Application Filed May 16, 2003,□□Title: Method for enabling communication and condition monitoring . . . □□. . . wireless techniques.*
Method / System for utilizing multiple sensors for monitoring container security, content / condition. Provisional Appl. No. 60/411,042, filed on Sep. 17, 2002.*

* cited by examiner

*Primary Examiner*—Hung Nguyen
(74) *Attorney, Agent, or Firm*—Thomas J. Finn; Leonard A. Alkov; Karl A. Vick

(57) ABSTRACT

A system and method for monitoring a cargo container. The novel system (100) includes a sensor module (10) mounted in each target area (20) and a central monitoring system (40). Each sensor module (10) includes one or more sensors (22) and a transceiver (28) for transmitting data from the sensors to the central monitoring system (40). The central monitoring system (40) includes a transceiver (44) for receiving the data from all sensor modules (10) and a local master processor (46) for processing and analyzing the data. In the preferred embodiment, each transceiver (28) is capable of receiving and retransmitting signals of other sensor modules to relay signals of a particular sensor module (10) in a daisy chain fashion to and from the central monitoring system (40).

29 Claims, 4 Drawing Sheets

SENSOR SUITE AND COMMUNICATION SYSTEM FOR CARGO MONITORING AND IDENTIFICATION

BACKGROUND OF THE INVENTION

1. Field of the Invention

The present invention relates to sensors. More specifically, the present invention relates to systems for detecting hazardous materials.

2. Description of the Related Art

Recent world events have revealed the need for early detection and interdiction of materials that can be used to construct weapons of mass destruction, i.e., explosives, biological and chemical agents, and nuclear materials. At the present time, the only comprehensive means of detection are random searches for which the probability of detection is small due to the limited sample set. Point solutions exist for the detection of various materials, such as an explosives detection unit. The cost, size, and limited throughput of these units, however, have limited their deployment.

Furthermore, inspections typically occur when materials are already at a vulnerable destination and the process of inspection may trigger detonation. Much of the recent interest in port security has therefore been directed towards monitoring the contents of cargo containers while in transit.

Cargo monitoring would require the establishment and maintenance of an RF link between a central monitoring system and each cargo container between the time the container is loaded on the shipping vessel and the time it reaches its destination. The RF environment in which this link must be established would be hostile, however, since in general the space between the two transceivers would be filled with large metal boxes stacked in close proximity (the cargo containers) housed inside another very large metal box (the hull of the ship). An RF signal can propagate only in the gaps between neighboring containers, and will encounter reflection-causing discontinuities at every turn. Clearly, it may not be possible to establish a direct link between any two transceivers in such an environment.

Hence, a need exists in the art for an inexpensive system or method for remote detection of multiple hazardous materials in cargo containers, and a system or method for communicating data acquired by detectors in cargo containers.

SUMMARY OF THE INVENTION

The need in the art is addressed by the system and method for monitoring a cargo container of the present invention. The novel system includes a sensor module mounted in each target area and a central monitoring system. Each sensor module includes one or more sensors and a transceiver for transmitting data from the sensors to the central monitoring system. The central monitoring system includes a transceiver for receiving the data from all sensor modules and a local master processor for processing and analyzing the data.

The invention takes advantage of an availability of a long integration time for the illustrative application, which allows for the use of small inexpensive detectors for the various threats of interest, allowing a suite of such detectors to be packaged in a compact enclosure. In the preferred embodiment, each sensor module transceiver is capable of receiving and retransmitting signals of other sensor modules to relay signals from a particular sensor module in a daisy chain fashion to and from the central monitoring system.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Existing detectors are large and expensive primarily because they are required to detect the presence of explosives in a short time (about 10–20 seconds) with low probability of false alarm. This invention relies on the availability of a longer integration time (hours to days), which allows the use of small inexpensive detectors for the various threats of interest, allowing a suite of such detectors to be packaged in a compact enclosure. Such a sensor suite located in a shipping container has days or weeks in which to detect and reconfirm the presence of a hazardous material. A sensor suite located in the cargo hold of a commercial aircraft may have an integration time of up to several hours.

The present invention includes a compact self-contained suite of sensors that takes advantage of a long integration time to reliably detect the presence of chemical explosives, deadly biological agents, and radiological materials in an enclosed area. One realization of this invention is a battery-powered unit that would be used to detect these materials inside a shipping container. Such a sensor suite might take the form of a sealed "black box" having no external wiring or power source. The system includes a low power communication approach, which allows the containers to relay information to a ship or land-based master processor that interrogates each container and then communicates individual container status via a satellite link to a ground station that performs the monitoring and tracking function.

Figure 1:
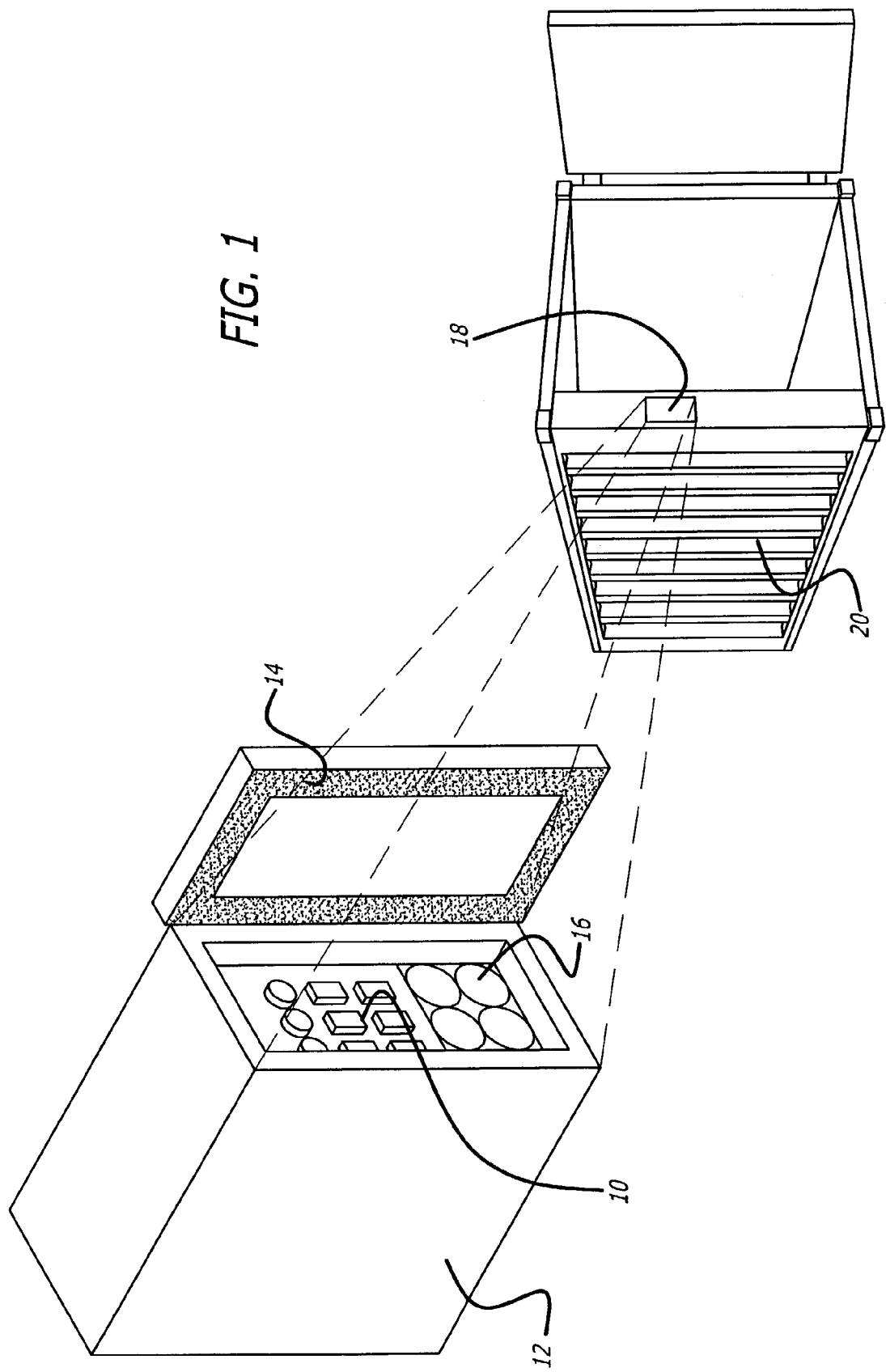
FIG. 1 is an illustration showing an illustrative embodiment of the sensor module of the present invention mounted inside a cargo container.

FIG. 1 is an illustration showing an illustrative embodiment of the sensor module 10 of the present invention mounted inside a cargo container 20. The sensor module 10 is contained in a security housing 12 and is sealed with weatherproof seals 14. The sensor module 10 includes a self-contained power source 16 and occupies unused volume within the container framework 18 that is unusable as packing space for commercial cargo. In the preferred embodiment, the black box 10 contains safeguards to prevent tampering, e.g., motion detectors or kill switches to prevent removal and security codes to protect data integrity. Tampering and/or the presence of hazardous materials is monitored by remote interrogation during shipment using a COTS based two-way SATCOM or similar messaging infrastructure.

Figure 2:
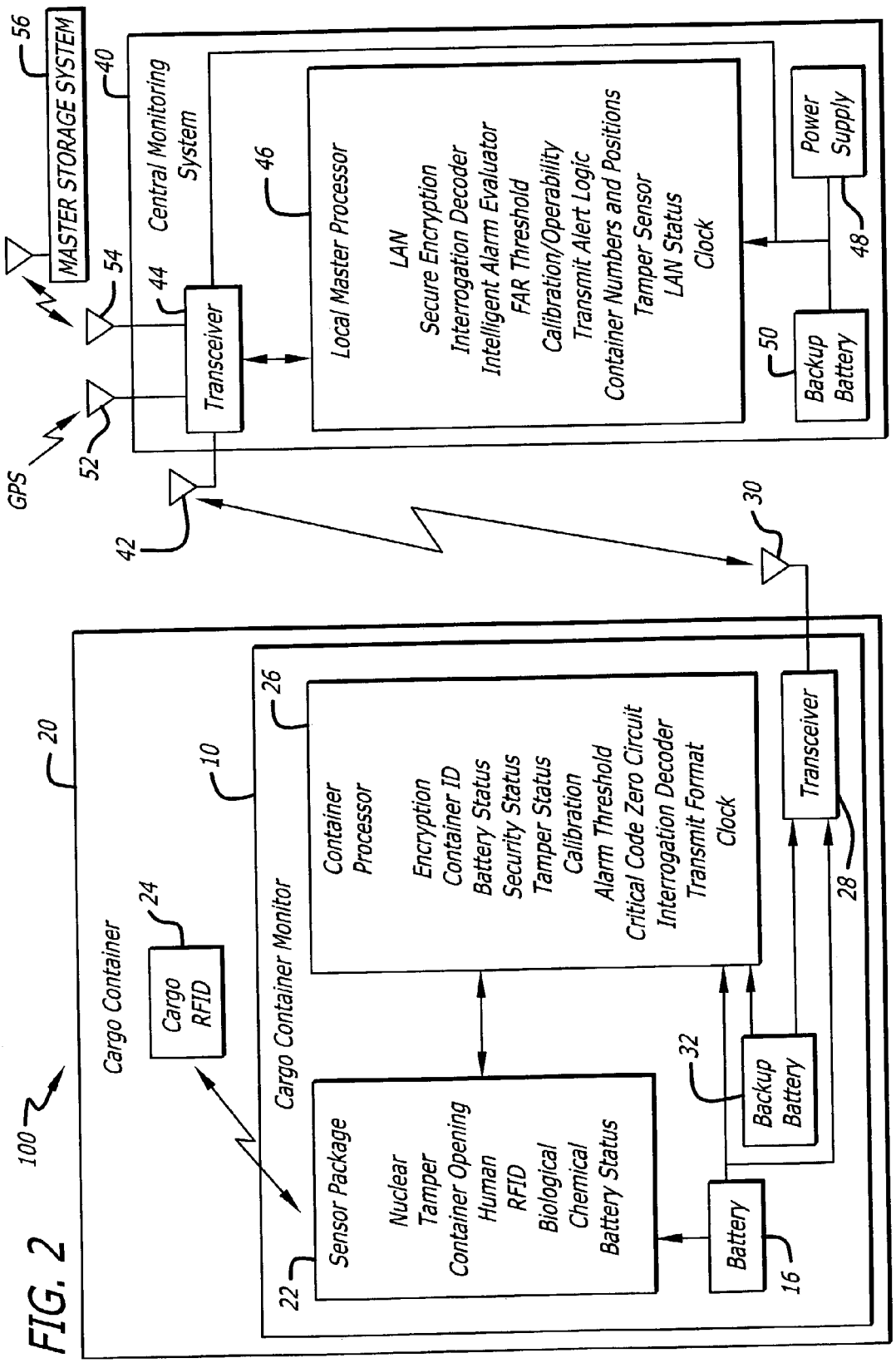
FIG. 2 is a system block diagram of a cargo container monitoring system designed in accordance with the teachings of the present invention.

FIG. 2 is a system block diagram of a cargo container monitoring system 100 designed in accordance with the teachings of the present invention. Each cargo container 20 is equipped with a "black box" sensor module 10. Each black box 10 includes a sensor package 22 which could contain any combination of individual sensors. The sensor package 22 may include a sensor to detect a cargo container RF ID 24. Data from the sensors 22 is processed by a processor 26 and transmitted by a transceiver 28 and antenna 30 to a central monitoring system 40. The sensors 22, processor 26, and transceiver 28 are powered by a battery 16. In the preferred embodiment, the module 10 also includes a backup battery 32.

The central monitoring system 40 receives and processes data from each cargo container. The central monitoring system 40 includes an antenna 42 and transceiver 44 for receiving data from the sensor modules 10, and a local master processor 46, which analyzes the data. The transceiver 44 and processor 46 are powered by a power supply 48 and a backup battery 50. The system 40 may also include an antenna 52 for receiving data from a GPS system, and/or an antenna 54 for providing a satellite link with a master storage system 56. The master storage system 56 may be a ground station that performs monitoring and tracking, and issues warnings of any adverse container activity.

Each black box 10 contains an inexpensive set of commercial off-the-shelf (COTS) sensors each designed to detect a different class of threats, as well as self-diagnostic and communication sensors. One possible set of sensors and the threats they are designed to detect is given in Table 1.

TABLE 1

| Sensor | Threat Detected |
| --- | --- |
| Geiger-Mueller Tube | Nuclear Materials (Gamma Rays) |
| Neutron Bubble Detector | Nuclear Materials (Neutrons) |
| Gas Sensor | Explosives, Chemicals |
| Microphone | Presence of Animals, Humans |
| Ultrasonic Transducer | Human/Animal/Cargo Movement, Range |
| Hall Effect Sensor | Tampering (Position of Doors, Latches) |
| Electromechanical Switch | Tampering (Position of Doors, Latches) |
| Heat and Optical Transmission | Fire |

The list of sensors in Table 1 is meant to be representative and not comprehensive. Notice that some sensors are redundant. This is intentional, as some degree of sensor redundancy provides some protection against sensor failure, and correlation of data from redundant sensors can be used to reduce the false-alarm rate to an acceptable level.

In one embodiment, the container monitor sensors are modular, to allow any set of sensors to be easily plugged into or removed from the monitor package. This scheme allows the cargo container monitors 10 to be cost effective. Expensive sensors would be included in a particular monitor only if they were justified. This would allow sensor upgrade and replacement to be effectuated inexpensively. Additional sensors can be added to a system to detect new threats. The battery 16 can be part of the modular system and thus allow easy change out of batteries or the installation of multiple batteries for longer time of operation.

The sensors may be part of a common communication and power buss system. As part of the sensor buss a device can be added to allow the remote recharging of batteries. The charging device could be a receiver to pick up alternating current power that is sent to the package from an external power transmitter that is near the cargo container. The external power could be applied at times such as when the cargo container is in the process of being loaded on a ship. In accordance with the present teachings, battery charge status may be transmitted to allow battery replacement and charging to be scheduled.

As mentioned above, the present invention relies on the availability of a long integration time (hours to days), which allows for the use of small inexpensive detectors for the various threats of interest, allowing a suite of such detectors to be packaged in a compact enclosure. Such a sensor suite located in a shipping container has days or weeks in which to detect and confirm with high degree of certainty the presence of a hazardous material. A sensor suite located in the cargo hold or staging area of a commercial aircraft may have an integration time of several hours, but the availability of aircraft power allows the integration time to be significantly magnified by active sampling, i.e., using a fan to draw in air which is then sampled at a much greater rate than if passive sampling is used.

Each sensor is identified with a unique non-repeating identification number. The data packet sent to the local master processor 46 contains the sensor serial number, cargo container number, and the sensor output.

In the preferred embodiment of the present invention, each individual black box 10 incorporates little or no data processing capability. Rather, each black box 10 sends its data over a local area network to a local master processor 46, which is co-located on board the same cargo ship or port location. This architecture eliminates the need for a complex processing unit in each black box 10, simplifies the design and lowers the cost of the black box. The processing of all the sensor data at one location allows for a much more capable processor and an important reduction in limited communication bandwidth.

Having all the data simultaneously present in the local master processor 46 allows the data to be synergistically analyzed to reveal things that any single sensor or box would not reveal. For example, the natural background of the local region can be determined by averaging sensor data from different black boxes in the same area. Comparisons can then be made with the data gathered by sensors located elsewhere on the ship. This allows the averaging of local backgrounds and the removal of noise terms such as variable natural or man-made variances. The level determination can be weighted and changed as a function of time by using other sensors and GPS location to track known levels at absolute positions. A container that is known to have a particular radioactive background can be accounted for with algorithms that provide an expected sensor interaction level and relative location. This allows a sensor to be able to detect an event that is beneath the natural noise variance floor.

The local master processor scheme can be used to calibrate the individual sensors and compensate for sensor drift terms. This will allow sensors, in effect, to be much more sensitive. It is necessary that the processor use algorithms that allow it to differentiate between drift and signal levels. The algorithm monitors and corrects for background variations as a function of both time and sensor location by fusing the data to come up with an optimal synergistic detection policy with emphasis on having a low false alarm. The sensor output is categorized into possible problem areas, for example a fire in the container or people in the container. All sensors necessary to help define a particular problem are interrogated to define the probability of the problem existing. An alarm is issued if the probability is greater than an alarm threshold. The alarm threshold is set based on the consequences of the timeliness of an alarm for that particular problem. The cost function incorporates both probability of detection and probability of false alarm. When an upgrade or algorithm change is needed the individual boxes 10 need not be changed. The algorithm in the master box 40 can be modified from a remote site 56 if the situation warrants a different algorithm.

In an alternative embodiment of this invention, a similar sensor suite 10 could be used to detect the target materials in the cargo hold of truck, commercial aircraft, or other forms of transportation or storage areas. The availability of aircraft power allows the integration of a fan into the detection suite, greatly increasing the throughput of any airborne particles, thus increasing the probability of detection. A similar unit could be used to detect the presence of target materials in the aircraft passenger cabin. One possible mode of installation is to integrate the sensor suite into the air conditioning system, eliminating the need for a separate fan and keeping the unit out of the view of the passengers.

One key part of the local master processor scheme is its ability to condense the sensor data into a short summary status. This allows the system status to be presented with a very short burst of data. This is very important, as the RF bandwidth of any communication scheme is limited.

In the preferred embodiment, the sensor and processor scheme is not susceptible to being taken apart and reverse engineered. Even if a person took a box apart he would not be able to simulate the signal of any box in particular. This is because of unique passwords associated with each box. Tampering with any box destroys the box's unique password and the master processor would record a tamper fault that would remove creditability of the unit.

When a unit indicates it has been tampered with and its code destroyed, the unit's data is still transmitted in order to allow qualified evaluation of sensor data. This allows fuller diagnosis of the situation that caused the tamper indicator to trip and will help ascertain if, for example, intrusion detection or modification of the sensors could be associated with the tamper detection.

Each of the black box transceivers 28 is capable of receiving signals of other boxes to relay signals of a particular black box in a daisy chain fashion to and from the master processor 46. This allows low power communication between units.

Each unit has several different modes possible to preserve power depending on the type of sensor used, the amount of power it uses, and the amount of time it needs to perform its function.

The sensor has the ability to request encrypted sensor data at different levels, such as the raw data or just the output of when a threshold has been exceeded. Security codes can be required to change the level of access. The ability to change the sensor output signal type allows detailed evaluation in cases of concern.

A spoofing system cannot just record the encrypted output of a sensor and repeat it at a later time to simulate continued output of a sensor that might be disabled. This might be attempted to spoof a master controller into believing a signal was coming from an un-tampered sensor package, when in fact the sensor package had been disabled. Unique changing time signals associated with the encrypted data would not have been updated properly and thus show the data transmission was a repeat of another signal. For more security, the system can be augmented by including an encrypted number indicating the number of transmissions the sensor module has made in the transmitted signal.

In the preferred embodiment, countermeasure elements are incorporated into the units to prevent such things as a false signal turning on transmitters continually with the idea of running down the batteries.

The local master processor is intelligent to the point of being able to look at all signals received and make judgments based on the conditions of the containers as to what actions should be taken at any time.

In the preferred embodiment, the invention includes a novel communication system for two-way communication between the transceivers 28 located in the cargo containers 20 and the remotely located transceiver 44.

The cargo monitoring system 100 of the present invention requires a communications link between the central monitoring system 40 and each cargo container 20. The RF environment in which this link must be established is hostile, however, since in general the space between the two transceivers is filled with large metal boxes stacked in close proximity (the cargo containers) housed inside another very large metal box (the hull of the ship). An RF signal can propagate only in the gaps between neighboring containers, and will encounter reflection-causing discontinuities at every turn. Clearly, it may be difficult to establish a direct link between any two transceivers in such an environment.

The novel communications system of the present invention solves the problem of establishing a communications link in a hostile RF environment by utilizing the transceivers in neighboring cargo containers to create a chain of individual links from the transmitter to the receiver. The transmitter can be one of the cargo containers or an external transmitter (located on the deck, for example). The receiver can be another cargo container, or an external receiver. This can be implemented in a number of different ways, several of which will be described below.

Consider the case in which a transmitter located in a cargo container desires to establish a two-way communications link with a receiver located in a central monitoring system on the deck of the ship. The initiating transceiver (hereafter referred to as $T_0$) broadcasts an initial signal to determine which of the nearby cargo containers can "hear" it. $T_0$ then listens for responses, sorting them by signal strength and/or time of arrival, for example. Each respondent identifies itself to $T_0$ via a unique identification number, which is assigned to each transceiver. Based on the results, a link is established with the transceiver receiving the highest score, which will be referred to as $T_1$. $T_0$ and $T_1$ record and store the identification number of the other for later use. Following the establishment of a link between $T_0$ and $T_1$, $T_1$ follows the same procedure followed by $T_0$ to establish the next link in the chain. Once it establishes this link, $T_1$ records the ID number of the new link in the chain, $T_2$, which in turn records numbers of all the links in the chain for later reconstruction. This process proceeds until the last link in the chain, $T_N$, establishes a link with the target transceiver, at which point the chain is complete. Each transmitter waits a random period of time between receiving a signal and responding to the request for data. This reduces the probability that two transmitters would respond at the same time and interfere with successful data exchange.

At this point, the initiating transceiver $T_0$ holds the ID numbers and the order of all the transceivers in the chain, so that the link can be reestablished quickly at a later time if so desired. Moreover, once the chain is established, each link in the chain holds the ID numbers of the links on either side of it in the chain, allowing it to pass messages in either direction, making this a two-way communication link.

Figure 3:
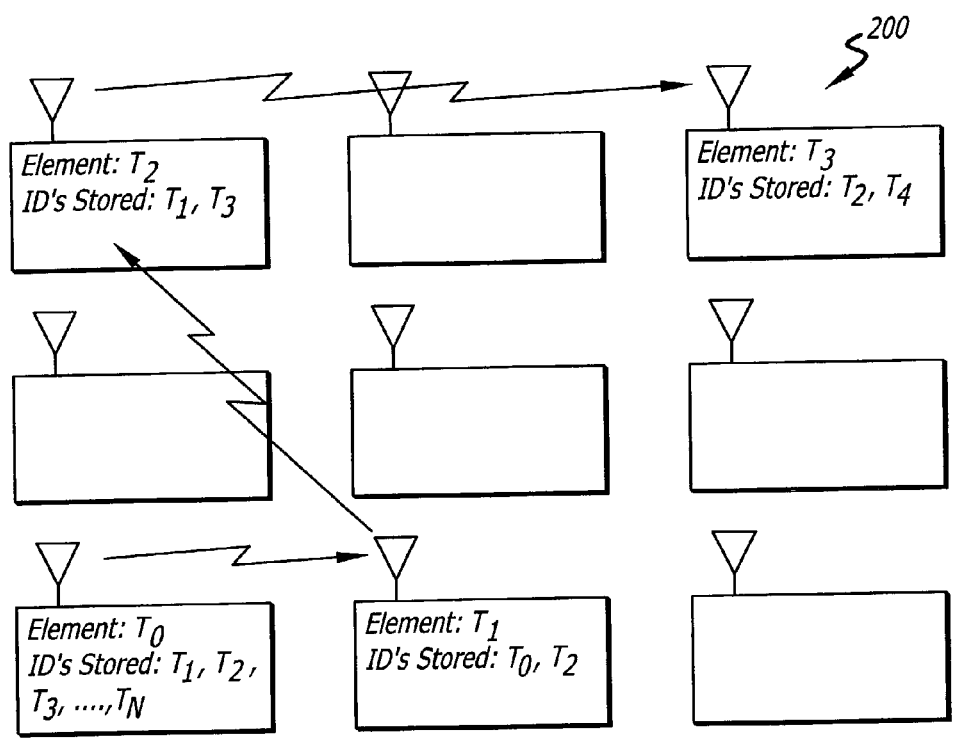
FIG. 3 is an illustration showing the first three links of a communications chain in accordance with the teachings of the present invention.

FIG. 3 is an illustration showing the first three links of a communications chain 200 in accordance with the teachings of the present invention. The chain 200 includes the initiating transceiver $T_0$, followed by elements $T_1$, $T_2$, and $T_3$. $T_0$ stores the ID numbers for $T_1, T_2, T_3, \ldots, T_N$. $T_1$ records the ID numbers for $T_0$ and $T_2$. $T_2$ records the ID numbers for $T_1$ and $T_3$. $T_3$ records the ID numbers for $T_2$ and $T_4$.

In order to prevent the establishment of a closed loop in the communications chain, the ID number of each new link in the chain must be compared to those of all previous links in the chain. If the new link is already present in the chain, the new link must be removed and a new one found. This situation is illustrated in FIGS. 4a–4c.

Figure 4A:
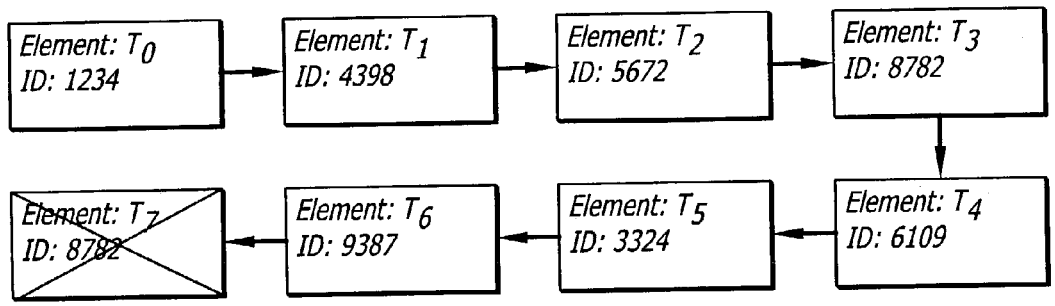
FIGS. 4a–4c illustrate a method for correcting for circular loops and dead ends in a communications chain in accordance with the teachings of the present invention.
Figure 4B:
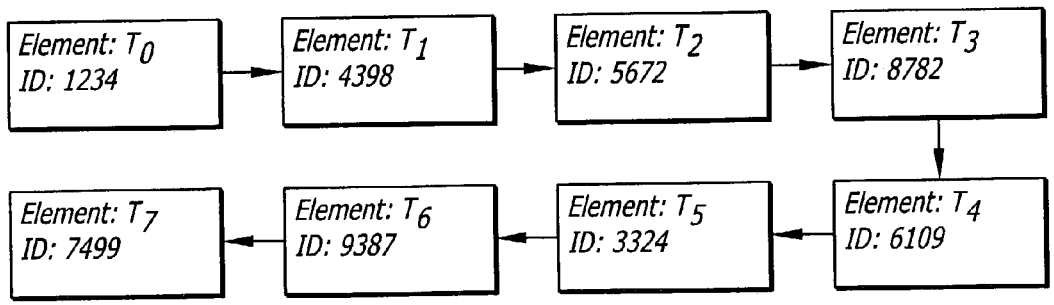
Figure 4C:
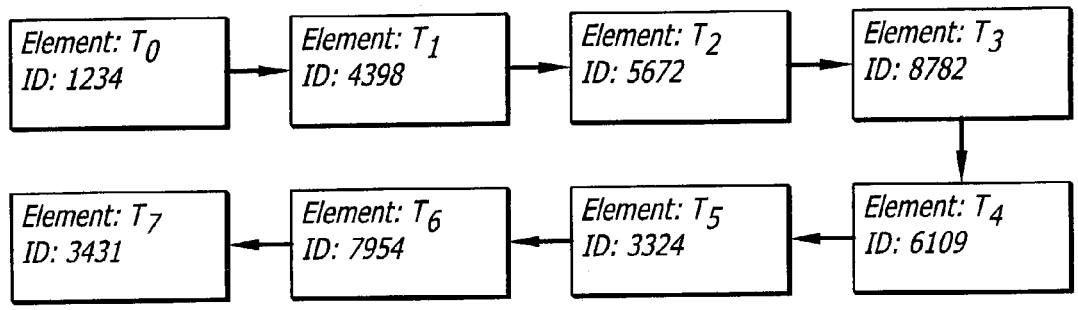

FIGS. 4a–4c illustrate a method for correcting for circular loops and dead ends in a communications chain in accordance with the teachings of the present invention. As shown in FIG. 4a, a chain has been formed with elements $T_0$, $T_1$, $T_2$, $T_3$, $T_4$, $T_5$, $T_6$, and $T_7$. Element $T_7$, however, is identical to element $T_3$, resulting in a closed circular loop. As shown in FIG. 4b, element $T_7$ is removed from the loop and is replaced by a different element.

If a replacement link cannot be found, a dead end has been reached, and the next-to-last link in the chain must be removed and replaced by another link that does not lead to a dead end. This situation is illustrated in FIG. 4c. If a replacement for $T_7$ cannot be found, element $T_6$ is also removed, and a replacement is found first for $T_6$ and then for $T_7$.

Figure 5A:
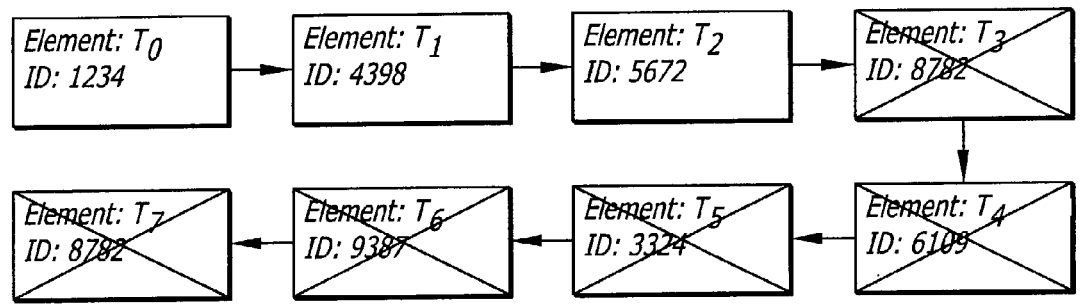
FIGS. 5a–5b illustrate an alternate method for correcting for circular loops and dead ends in a communications chain by removing the entire closed loop from the chain.
Figure 5B:
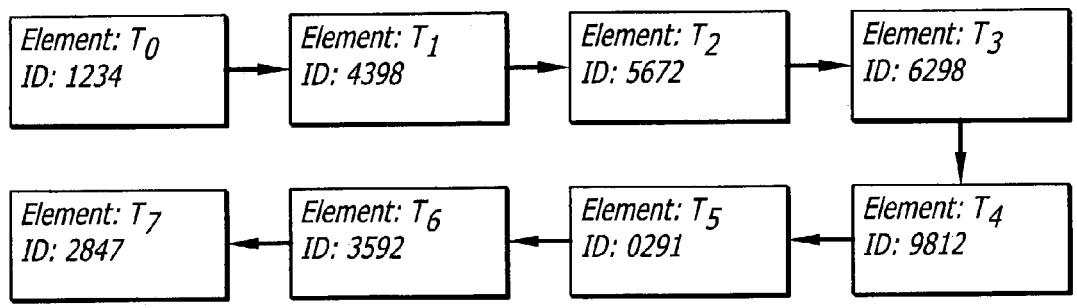

An alternative procedure that may prove more efficient is to remove the entire closed loop from the chain, and replace the repeated link with a new link, as illustrated in FIG. 5a–5b. In this example, a chain has been formed from elements $T_0$, $T_1$, $T_2$, $T_3$, $T_4$, $T_5$, $T_6$, and $T_7$. Element $T_7$ is identical to element $T_3$, resulting in a closed circular loop. As shown in FIG. 5a, the repeated link ($T_3$) and all the links in the closed loop ($T_3$, $T_4$, $T_5$, $T_6$, and $T_7$) are moved. As shown in FIG. 5b, the repeated link ($T_3$) is then replaced by a different element, and the chain continued from the new link.

Since the cargo containers are largely autonomous, it is likely that at any given time more than one cargo container will be attempting to establish a chain of communications between itself and the master controller. The simplest protocol for establishing priority is simply "first come, first served", meaning that the first chain to be completed gains priority, and other communication chains are put on hold until the first communication chain is no longer in use. Alternatively, one can assign messages a priority level. For example, if the communication chain is part of a cargo monitoring system, the priority levels could be assigned based on perceived levels of risk. A routine message reporting no change is assigned the lowest priority level, 0. On the other hand, a message reporting that the contents of a certain container are on fire is assigned a much higher priority level. A communication chain carrying such a message is given priority over other chains carrying lower priority messages and is allowed to interrupt an active chain (i.e., one that has already established a chain and is actively communicating with the master controller). The interrupted chain is put on hold until the priority communication is completed.

A related problem is the potential for two separate communication chains to simultaneously (or within a short period of time) attempt to incorporate a single element into each chain. Once again, competing claims for an element can be handled on a first come first served basis in which the first chain to incorporate an element into its chain gains exclusive use of that element until that chain is no longer in use, during which time the second chain is put on hold. Once the first chain is no longer in use, the second chain can make use of that element. If the destinations of the two chains are the same, e.g., the master controller, the second chain can be quickly completed by incorporating into itself the links in the first chain from the common element to the master controller.

Rather than initiating the communication chain from a cargo container, it may in some circumstances be preferable to initiate the chain from the master controller. The procedure is largely the same as that described above for the establishment of a chain starting from a cargo container. One advantage to having communications initiated by a single, centrally located master controller is the elimination of the possibility of interference and cross-talk due to multiple cargo containers trying to communicate simultaneously. Also eliminated are any conflicts resulting from attempts to incorporate a single element into multiple communication chains. Since the master controller does not suffer from the same potential limits on information storage as the transceiver in a cargo container, it can store the ID numbers of the elements in the communication chains terminating at every cargo container on the ship. In this scenario, the master controller would periodically interrogate each cargo container, ensuring that only one communication chain is active at any given time.

Moreover, it may be advantageous to pre-establish the links at the beginning of the voyage. The master controller is provided with a list of the ID numbers of each cargo container on board. At the beginning of the voyage (at any time after all cargo containers have been loaded aboard the ship) the master controller starts at the beginning of the list and establishes a chain ending at the first container on the list. Once established, the ID numbers of the links in the chain are stored on board the master controller for future use. The master controller then establishes a chain ending at the second container on the list and records the ID numbers of the links in the chain. This process continues until chains have been established ending at every container on the ship. The links in each chain are stored in the master controller. Since the master controller initiates all communication, only one chain is active at any given time. There is therefore no conflict if a single element is a member of two or more chains.

As before, each link in an active chain stores only the ID numbers of the links preceding and following it in the chain. The last link, the target cargo container, need store only the ID number of the link preceding it in the chain. At any given time, any link that is part of an active communication chain, stores only these two numbers, even if it is a member of two or more communication chains. Once the chain is no longer in use, the ID numbers are purged from memory or are simply overwritten the next time an element is incorporated into the same or a different chain.

If the physical location of each cargo container on board the ship is known, a network architecture having greater efficiency can be implemented. In this case, the information correlating the physical location of each cargo container with the ID number of its transceiver is located in the master controller. When a communication chain is to be established between the master controller and a particular cargo container, the master controller first determines the ID numbers of the cargo containers laying along the shortest physical path between the master controller and the desired cargo container. It then establishes the first link in the chain between itself and the first cargo container lying along the shortest path. The master controller passes the ID number of the second cargo container along the shortest path to the first cargo container, which then proceeds to contact the second cargo container, adding it to the chain. Once this link has been successfully established, the first cargo container stores the ID numbers of the master controller and the second cargo container. This process proceeds until the last cargo container along the shortest path establishes a link with the desired cargo container. Once the chain is complete, each link in the chain holds the ID numbers of the link preceding it in the chain, and the link following it in the chain, thus enabling two-way communications to take place once the chain has been established.

In this particular implementation, the master controller must initiate communication. Once the chain has been broken, a cargo container cannot reestablish the chain on its own. If it is required for each cargo container to be able to establish a communications chain between itself and the master controller, the procedure described above can be performed once for each cargo container after all cargo containers have been loaded aboard the ship, and the ID numbers and order of each cargo container in each communications chain can be stored in memory in the destination cargo container, enabling it to reestablish the chain if desired at a later time.

Whether or not the physical location of each cargo container is known, a key feature of the communication system described herein is its tolerance of faults, in particular the failure of a transceiver in the communication chain. A number of different methods for recovery can be implemented. For example, if a chain is initiated by the master controller, failure of a link in a chain that had been successfully established previously can be detected by the link preceding the failed link in the chain. This information is then passed back up the chain to the master controller. If the location of individual cargo containers is known, the master controller then uses this information to map a detour around the failed link to the next link in the chain on the other side of the failed link. If information on the location of individual cargo containers is unavailable, the master controller removes the ID number of the failed link from the chain, and proceeds to establish a new chain using the old chain (up to the failed link) as a starting point. These are but two examples of fault-recovery algorithms. Many others are possible.

In the preceding, it has been assumed that a master control system has been supplied with the ID numbers of every cargo container aboard the vessel. One method by which the master controller can obtain this information is by interrogating each cargo container as it is loaded on the vessel, perhaps through a transceiver located on the boom of the crane being used to load the ship. This supplies the master controller not only with the ID number of the transceiver, but also the location of the container after it has been loaded. This information is sufficient to develop a "map" allowing the master controller to determine the location of a cargo container by its ID number. In addition, a transceiver that fails to respond to this initial interrogation can be flagged, its location noted, and, if desired, the contents inspected either at that time or after the container is unloaded at its destination.

As noted previously, a chain of communication can be established not only between a cargo container and a master controller, but also between two cargo containers. A chain linking two cargo containers can be useful in cargo monitoring if the locations of individual cargo containers are known. For example, a radiation monitor in a particular cargo container might be measuring an unusually high level of radiation. Before sounding an alarm, however, it would be useful to compare its reading to those of nearby cargo containers to determine a local background level. A communication chain between the cargo container in question and nearby cargo containers allow such a comparison to be made, which will also help to reduce the false-alarm rate. Individual containers can communicate directly with each other, but the preferred method of reduction of false alarms involves decisions made using the master controller.

The communication system described herein can be used not only to establish communication aboard a container ship, but also in a shipyard where loaded cargo containers await loading aboard ship. Rather than communicating with a master controller on a ship, communication with a nearby node of a land-based network is established using the same communication system described above. This same system can also be used in the same way with shipping containers in rail yards, along railroad right-of-ways, beside highways, in airport cargo handling facilities, and truck terminals.

Additionally, this communications system topology could be adapted to applications other than transportation. For example, an array of remote sensors could be placed in the field to monitor environmental or physical events (e.g. weather or geological conditions). The transceiver associated with each sensor would use this communications scheme to establish a communications link to a master site. A similar approach could be adapted to an array of low power satellites to allow communications over an extended distance utilizing low power communication links configured with relatively small low gain antennas. This approach allows the line-of-sight distances and relative positions of the array elements to change dynamically without having to completely reconfigure the system.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

The invention claimed is:

1. A system for monitoring a cargo container comprising:
   a sensor module mounted in said container, said module including one or more sensors and first means for transmitting data from said sensor, said first means including a first transceiver, each transceiver being capable of receiving signals from other sensor modules to relay signals of a particular module in a daisy chain fashion to and from the central monitoring system;
   a central monitoring system having second means for receiving said data and third means for processing said data; and
   means for preventing circular loops and dead ends in a communication chain from a sensor module to said central monitoring system.

2. The invention of claim 1 including plural sensors and wherein said sensors include detectors of chemical explosives, biological agents, and/or radiological materials.

3. The invention of claim 2 wherein said third means is a local master processor.

4. The invention of claim 3 wherein said local master processor includes an algorithm for analyzing data from all sensors.

5. The invention of claim 2 wherein said central monitoring system further includes means for interrogating sensor modules.

6. The invention of claim 1 wherein said second means is a second transceiver.

7. The invention of claim 1 wherein said sensor module further includes fourth means for processing data from said sensor prior to transmission.

8. The invention of claim 7 wherein said fourth means is a processor.

9. The invention of claim 1 wherein said sensor module further includes a battery.

10. The invention of claim 1 wherein said sensor module further includes a backup battery.

11. The invention of claim 1 wherein said sensor module further includes means for preventing tampering.

12. The invention of claim 1 wherein said central monitoring system further includes means for receiving data from a GPS system.

13. The invention of claim 1 wherein said central monitoring system further includes means for communicating with a main monitoring system.

14. The invention of claim 1 wherein said central monitoring system further includes a fan for increasing the throughput of any airborne particles.

15. The invention of claim 1 wherein said sensors are modular to allow easy addition, replacement, or removal of said sensors.

16. The invention of claim 1 further including means for providing electronic cargo container identification data.

17. The invention of claim 16 wherein said means for providing electronic cargo container identification data includes means for providing an RFID.

18. The invention of claim 1 wherein said means for preventing circular loops and dead ends includes means for dynamically reconfiguring a chain between a module and said central monitoring system.

19. A communication system for cargo monitoring comprising:
a transceiver mounted in each cargo container;
a central monitoring system, wherein each transceiver is capable of receiving and retransmitting signals of other transceivers to relay signals of a particular transceiver in a daisy chain fashion to and from the central monitoring system; and
means for determining the next transceiver in the communication chain by broadcasting an initial signal, listening for responses, sorting said responses by signal strength and/or time of arrival, and establishing a link with the transceiver receiving the highest score.

20. The invention of claim 19 wherein each transceiver is identified by a unique identification number.

21. The invention of claim 20 wherein each transceiver includes means for recording the identification numbers of the transceivers preceding and following it in said chain.

22. The invention of claim 19 wherein said central monitoring system includes means for initiating communication with each transceiver.

23. The invention of claim 19 wherein said system includes means for correcting for circular loops and dead ends.

24. The invention of claim 23 wherein said means includes means for:
removing a transceiver from said chain if it is already present in the chain;
searching for a new link; and
removing and replacing the next-to-last link in the chain if a new link cannot be found.

25. The invention of claim 23 wherein said means includes means for:
removing the entire closed loop from the chain, and
replacing the repeated link with a new link.

26. A method for monitoring cargo containers including the steps of:
monitoring said containers using a sensor module in each container;
transmitting data from said sensor modules to a central monitoring system via a daisy chain network between said sensor modules;
preventing circular loops and dead ends in a communication chain from a sensor module to said central monitoring system; and
analyzing said data received from all sensor modules.

27. A communication system for cargo monitoring comprising:
a transceiver mounted in each cargo container;
a central monitoring system, wherein each transceiver is capable of receiving and retransmitting signals of other transceivers to relay signals of a particular transceiver in a daisy chain fashion to and from the central monitoring system; and
means for correcting for circular loops and dead ends.

28. The invention of claim 27 wherein said means for correcting for circular loops and dead ends includes means for:
removing a transceiver from said chain if it is already present in the chain;
searching for a new link; and
removing and replacing the next-to-last link in the chain if a new link cannot be found.

29. The invention of claim 27 wherein said means for correcting for circular loops and dead ends includes means for:
removing the entire closed loop from the chain, and
replacing the repeated link with a new link.

* * * * *